(12) United States Patent
Yamada

(10) Patent No.: US 8,435,695 B2
(45) Date of Patent: May 7, 2013

(54) GAS DIFFUSION ELECTRODE, FUEL CELL, AND MANUFACTURING METHOD FOR THE GAS DIFFUSION ELECTRODE

(75) Inventor: Kazuhiro Yamada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 616 days.

(21) Appl. No.: 12/518,573

(22) PCT Filed: Jan. 31, 2008

(86) PCT No.: PCT/JP2008/052000
§ 371 (c)(1),
(2), (4) Date: Jun. 10, 2009

(87) PCT Pub. No.: WO2008/093895
PCT Pub. Date: Aug. 7, 2008

(65) Prior Publication Data
US 2010/0136457 A1     Jun. 3, 2010

(30) Foreign Application Priority Data

Feb. 1, 2007   (JP) .................................. 2007-023114

(51) Int. Cl.
*H01M 8/10*   (2006.01)
*H01M 4/02*   (2006.01)
*H01M 4/36*   (2006.01)
*H01M 4/92*   (2006.01)
*C23C 14/00*  (2006.01)

(52) U.S. Cl.
USPC ....... 429/481; 429/480; 429/524; 204/192.17

(58) Field of Classification Search .................. 429/480, 429/481, 524, 192.17; 204/192.17
See application file for complete search history.

(56) References Cited

U.S. PATENT DOCUMENTS

| 5,879,827 | A | 3/1999 | Debe et al. |
| 6,127,059 | A | 10/2000 | Kato |

(Continued)

FOREIGN PATENT DOCUMENTS

| JP | 8-106915 A | 4/1996 |
| JP | 11-510311 A | 9/1999 |

(Continued)

OTHER PUBLICATIONS

Office Action in Korean Application No. 10-2009-7016439 (Apr. 19, 2011).

(Continued)

*Primary Examiner* — Patrick Ryan
*Assistant Examiner* — Julian Anthony
(74) *Attorney, Agent, or Firm* — Fitzpatrick, Cella, Harper & Scinto

(57) ABSTRACT

The present invention provides a gas diffusion electrode in which flooding therein is suppressed. The gas diffusion electrode includes: a membrane formed of conductive fibers; a layer formed of conductive fine particles existing while coming into contact with one of surfaces of the membrane; and a catalyst, in which the membrane formed of the conductive fibers includes a region carrying the catalyst and a region free from carrying the catalyst, the region carrying the catalyst including a surface of the membrane formed of the conductive fibers on an opposite side of a surface of the membrane formed of the conductive fibers, which is brought into contact with the layer formed of the conductive fine particles. The catalyst can be formed by a reactive sputtering method.

5 Claims, 12 Drawing Sheets

U.S. PATENT DOCUMENTS

| | | | |
|---|---|---|---|
| 6,444,347 B1 | 9/2002 | Ouvry et al. | |
| 6,605,381 B1 | 8/2003 | Rosenmayer | |
| 6,716,551 B2 * | 4/2004 | Peinecke et al. | 429/457 |
| 6,746,793 B1 | 6/2004 | Gyoten et al. | |
| 6,946,214 B2 | 9/2005 | Xie et al. | |
| 6,972,162 B2 * | 12/2005 | Gao et al. | 429/480 |
| 7,282,293 B2 | 10/2007 | Ren et al. | |
| 7,407,721 B2 | 8/2008 | Ren et al. | |
| 2002/0146616 A1 | 10/2002 | Yasuo et al. | |
| 2007/0134544 A1 | 6/2007 | Yamada et al. | |
| 2007/0212591 A1 * | 9/2007 | Miyazaki et al. | 429/40 |

FOREIGN PATENT DOCUMENTS

| | | |
|---|---|---|
| JP | 2001-519594 A | 10/2001 |
| JP | 2002-534773 A | 10/2002 |
| JP | 2002-343369 A | 11/2002 |
| JP | 3444530 B2 | 9/2003 |
| JP | 3594533 B2 | 12/2004 |
| JP | 2006-032170 A | 2/2006 |
| JP | 2006-049278 A | 2/2006 |
| JP | 2006-134603 A | 5/2006 |
| JP | 2006-134640 A | 5/2006 |
| JP | 3773325 B2 | 5/2006 |
| JP | 2006-332041 A | 12/2006 |
| KR | 10-2006-0000536 A | 1/2006 |
| WO | 97/21256 A1 | 6/1997 |
| WO | 2004/093231 A2 | 10/2004 |
| WO | 2006/004023 A1 | 1/2006 |

OTHER PUBLICATIONS

Office Action in Japanese Application No. 2007-023114 (Jul. 3, 2012).

* cited by examiner

GAS DIFFUSION ELECTRODE, FUEL CELL, AND MANUFACTURING METHOD FOR THE GAS DIFFUSION ELECTRODE

TECHNICAL FIELD

The present invention relates to a gas diffusion electrode for a fuel cell, the fuel cell, and a manufacturing method for the gas diffusion electrode.

BACKGROUND ART

Polymer electrolyte fuel cells have high energy conversion efficiency, is clean, is quiet, and an operation temperature thereof is 100° C. or less. Therefore, the polymer electrolyte fuel cell is expected as a future energy generation device.

Further, because the polymer electrolyte fuel cell has high energy density and the low operation temperature, in recent years, not only application to automobiles, household power generators, or the like, but also application to portable electrical apparatuses such as mobile phones, notebook personal computers, or digital cameras are taken in consideration. The polymer electrolyte fuel cell is capable of driving the portable apparatuses for a long time compared to a related-art lithium ion secondary battery, thereby receiving attention.

The polymer electrolyte fuel cell generally has a structure in which a membrane electrode assembly (hereinafter, abbreviated as "MEA" in some cases) is sandwiched between conductive separators. The MEA has a structure in which a polymer electrolyte membrane is sandwiched between a pair of porous gas diffusion electrodes.

In general, the polymer electrolyte fuel cell has a problem in that, with a passage of power generation time, a voltage is gradually reduced due to a flooding phenomenon, and the power generation stops at last.

In the flooding phenomenon, because water produced in a reaction remains in spaces of the gas diffusion electrode, supply of a fuel gas serving as a reactant is inhibited, thereby causing voltage reduction or stoppage of the power generation reaction. In particular, the flooding tends to occur in the gas diffusion electrode on the cathode side in which water is produced. Accordingly, enhancement of dissipativeness of the product water from the gas diffusion electrode is an important factor affecting performance stability of the fuel cell.

In order to suppress the flooding phenomenon, the gas diffusion electrode is usually added with a hydrophobic resin such as polytetrafluoroethylene (PTFE), thereby making inside of pores of the gas diffusion electrode hydrophobic.

Further, in the fuel cell for application to automobiles and household generators, there is used an auxiliary device such as a blower or a temperature/humidity control system to maintain the gas diffusion electrodes under an appropriate temperature/humidity environment.

However, in the fuel cell for the application to portable electrical apparatuses, in order to suppress electrical power consumption of the auxiliary devices and battery dimensions, it is demanded that a minimum number of auxiliary devices be used to achieve downsizing and weight reduction of the fuel cell.

Thus, in the fuel cell for the portable electrical apparatuses, it is desirable that the temperature/humidity control system be not used, and it is preferable that a fan or a blower be not used or be used in a minimum airflow rate when used. The gas diffusion electrode of the fuel cell for the portable apparatuses is required of not causing flooding even when the airflow rate is low or zero.

Thus, in the gas diffusion electrode of the fuel cell for the portable electrical apparatuses, there is demanded a function capable of coping with the flooding even when the airflow rate is low.

An example of the gas diffusion electrode includes one in which a catalyst is carried by a carbon fiber sheet (for example, Japanese Patent Application Laid-Open No. H08-106915, Japanese Patent Application Laid-Open No. H11-510311, Japanese Patent Application Laid-Open No. 2002-534773, Japanese Patent Application Laid-Open No. 2006-032170, Japanese Patent No. 3773325, and Japanese Patent No. 3444530). As the carbon fiber sheet, carbon paper or carbon cloth is used most widely, which is formed of carbon fibers each having a diameter of about several micrometers. In order to rapidly discharge the product water caused by the fuel cell reaction, the carbon fibers are generally coated with a hydrophobic resin such as PTFE, thereby being hydrophobically treated.

However, in a case of the above-mentioned structure, an interface between the gas diffusion electrode and the separator is fibrous, so a peak pore diameter in the interface is several tens of micrometers or more, which is too large. Thus, there is a problem in that capillary forces of the pores are weak and sufficient drainage property cannot be obtained, thereby easily causing flooding.

In order to solve the problem, what has been the mainstream recently is a gas diffusion electrode obtained by laminating three layers, which are (1) a carbon fiber layer formed of carbon fibers, (2) a carbon fine particle layer, and (3) platinum carrying carbon fine particles (for example, Japanese Patent No. 3773325, Japanese Patent No. 3444530, Japanese Patent No. 3594533, or ELAT (US registered trademark, E-TEK)).

Currently, (1) the carbon fiber layer and (2) the carbon fine particle layer are laminated to each other to be commercially available as a gas diffusion layer from plural makers. Accordingly, in this specification, this is referred to as the gas diffusion layer (hereinafter, abbreviated as "GDL" in some cases) (commercial example: trade name LT-1200W (E-TEK), Avcarb 2120 (Ballard Power Systems Inc.), CARBEL (registered trademark, JAPAN GORE-TEX INC)).

In the GDL, the interface between the carbon fiber layer and the carbon fine particle layer is not necessarily definite. That is, in many cases, and the carbon fine particle layer partially intrudes into the carbon fiber layer, or, carbon fine particles having the same composition as that of the carbon fine particle layer are also arranged between the carbon fibers.

In general, the carbon fine particle layer is formed of an aggregate of the carbon fine particles, which includes the hydrophobic resin such as PTFE as a binder. For the carbon fine particles, there may be often used acetylene black which is graphitized.

Pore diameters of the carbon fine particle layer are in a distribution of about 0.1 to several micrometers. Accordingly, the carbon fine particle layer has a low water permeability and functions to inhibit the draining from the catalyst layer to some extent, thereby achieving an effect of retaining moisture of the electrolyte in the MEA. Further, the carbon fine particle layer also has an effect of preventing the product water remaining in the fiber layer from flowing back to the catalyst layer.

As described above, by causing the gas diffusion electrode to have a three-layer structure, even when the product water remains in a part of the GDL, air supply to the catalyst layer is maintained, so the flooding can be prevented.

However, according to Japanese Patent Application Laid-Open No. 2002-343369, there is pointed out a problem in that, since the interface between the GDL and the separator is fibrous, and the interface is a hydrophilic/hydrophobic interface, the product water tends to remain in the interface, thereby easily causing the flooding.

Japanese Patent Application Laid-Open No. 2002-343369 discloses that, with the provision of a layer formed of the same composition as that of the carbon fine particle layer to the interface, the above-mentioned problem can be solved. Further, U.S. Pat. No. 6,605,381 also discloses a gas diffusion electrode of the same structure.

On the other hand, Japanese Patent Application Laid-Open No. 2006-049278 and Japanese Patent Application Laid-open No. 2001-519594 each discloses a method of forming a catalyst layer thinner than that of the related art by using a vapor phase deposition method such as a sputtering method or an ion plating method.

As described above, recently, there has been developed a method of forming a catalyst layer in a form of a thin film by using a manufacturing method such as the sputtering method. The thin catalyst layer has a membrane thickness smaller than that of the related art, so a diffusion distance of a reactant gas, the product water, or the like is short and material diffusibility thereof is superior. Accordingly, there is an advantage in that high power generation property can be obtained even with a small amount of catalyst metal.

Further, an organic solvent amount required at a time of manufacture can be saved compared to that in the related art, so there is an advantage in that an environmental load is small.

However, the thin film catalyst layer formed by using the sputtering method illustrated in each of Japanese Patent Application Laid-Open No. 2006-049278 and Japanese Patent Application Laid-open No. 2001-519594 does not employ a carrier, so a pore volume is reduced compared to that in the related-art platinum carrying carbon catalyst layer.

Therefore, there is a problem in that, even when the product water remaining in the catalyst layer is small, the flooding easily occurs. In a case where the thin film catalyst layer and the GDL having the structure as described in Japanese Patent No. 3773325, Japanese Patent No. 3444530, Japanese Patent No. 3594533, Japanese Patent Application Laid-Open No. 2002-343369, and U.S. Pat. No. 6,605,381 are combined with each other, the draining from the catalyst layer is inhibited by the carbon fine particle layer, so there is a problem in that the thin film catalyst layer easily causes the flooding.

Further, in a case where the thin film catalyst layer is applied to the gas diffusion electrode having a structure according to Japanese Patent Application Laid-Open No. H08-106915, Japanese Patent Application Laid-Open No. H11-510311, or Japanese Patent Application Laid-Open No. 2002-534773, mentioned above, the capillary force is weak as described above. Accordingly, sufficient draining property cannot be obtained, so, again, there is a problem in that the flooding easily occurs.

In view of this, there is a demand for a technology for suppressing the flooding of the thin film catalyst layer formed by the sputtering method and the ion plating method, the technology involving low manufacturing costs.

DISCLOSURE OF THE INVENTION

The present invention has been made in view of the above-mentioned circumstances, and provides a gas diffusion electrode for a polymer electrolyte fuel cell, in which flooding in a gas diffusion electrode is suppressed, and a manufacturing method therefor.

Further, the present invention provides, at low costs, a polymer electrolyte fuel cell having stable power generation property.

The present invention has been made through diligent study, for solving the above-mentioned problems and has the following structure.

That is, the present invention provides a gas diffusion electrode including: a membrane formed of conductive fibers; a layer formed of conductive fine particles existing while coming into contact with one of surfaces of the membrane; and a catalyst, in which the membrane formed of the conductive fibers includes a region carrying the catalyst and a region free from carrying the catalyst, the region carrying the catalyst including a surface of the membrane formed of the conductive fibers on an opposite side of a surface of the membrane formed of the conductive fibers, which is brought into contact with the layer formed of the conductive fine particles. In this case, the terms "one of surfaces" and "a surface on an opposite side" mean surfaces to be referred to as main surfaces of the membrane formed of the conductive fibers. In a case where a shape of the membrane formed of the conductive fibers can approximate to a rectangular parallelepiped, the "one of surfaces" and the "a surface on an opposite side" correspond to a pair of surfaces having a largest area of three pairs of opposing surfaces. Note that when the membrane formed of the conductive fibers can approximate to a column, the "one of surfaces" and the "a surface on an opposite side" generally correspond to an upper surface and a lower surface. Even in a case where the membrane formed of the conductive fibers cannot approximate to the rectangular parallelepiped or the column, determination based on commonsense can be made. Note that each of the surfaces actually has irregularities.

The catalyst can be directly carried by the conductive fibers in the region carrying the catalyst.

Further, each of the region carrying the catalyst of the membrane formed of the conductive fibers, the region free from carrying the catalyst of the membrane formed of the conductive fibers, and the layer formed of the conductive fine particles can include a hydrophobic agent.

Further, the region carrying the catalyst can have a thickness of 20 μm or more in a direction perpendicular to the one of the surfaces, and the region free from carrying the catalyst can have a thickness of 50 μm or more in the direction perpendicular to the one of the surfaces. In this case, the phrase "the direction perpendicular to the one of the surfaces" means, in a case where the "one of the surfaces" approximates to a plane, a direction perpendicular to the plane. This is the same in meaning as a "layer (membrane) thickness direction" used often in general.

The catalyst can be formed on the conductive fibers by one of oxidation reactive sputtering and reactive ion plating.

The catalyst can be obtained by reducing platinum oxide.

Further, the present invention provides a fuel cell including at least: a pair of gas diffusion electrodes; and an electrolyte membrane sandwiched between the pair of gas diffusion electrodes, in which: at least one of the pair of gas diffusion electrodes includes the gas diffusion electrode according to any one of the above-mentioned aspects; and the region carrying the catalyst is brought into contact with the electrolyte membrane.

Further, the present invention provides a manufacturing method for a gas diffusion electrode, the gas diffusion electrode including a membrane formed of conductive fibers; a layer formed of conductive fine particles existing while coming into contact with one of surfaces of the membrane; and a catalyst, the manufacturing method including forming a region carrying one of a catalyst and a precursor thereof and a region free from carrying one of the catalyst and the precursor thereof on the membrane formed of the conductive fibers by forming one of the catalyst and the precursor thereof on a side of a surface free from being brought into contact with the layer formed of the conductive fine particles by one of oxidation reactive sputtering and reactive ion plating.

The manufacturing method for a gas diffusion electrode can further include reducing, after the membrane formed of the conductive fibers is provided with a catalyst precursor including platinum oxide in the forming, the platinum oxide to form a catalyst.

Further features of the present invention will become apparent from the following description of exemplary embodiments with reference to the attached drawings.

BEST MODE FOR CARRYING OUT THE INVENTION

Hereinafter, with reference to the drawings, descriptions will be made of a gas diffusion electrode and a fuel cell according to a exemplary embodiment of the present invention. Note that, a scope of the present invention is determined by the scope of claims, and the following descriptions are not intended to limit the scope of the present invention. For example, materials, dimensions, shapes, arrangements, or manufacturing conditions described below are not provided for limiting the scope of the present invention.

Figure 1:
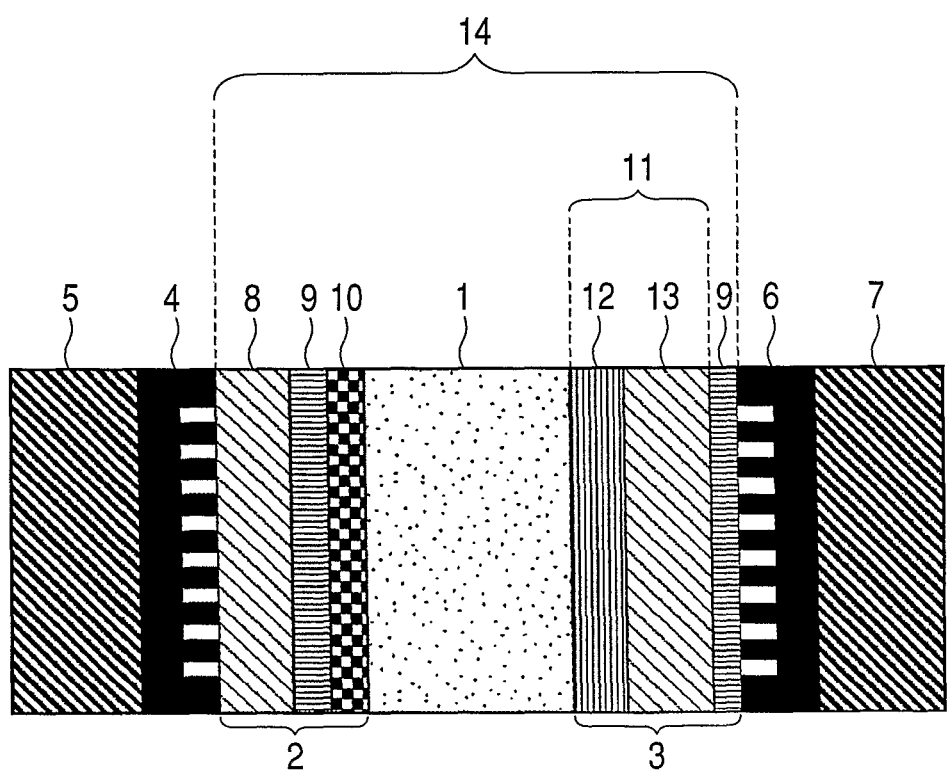
FIG. 1 is an example of a schematic view illustrating a sectional structure of a fuel cell unit of a polymer electrolyte fuel cell manufactured by using gas diffusion electrodes according to the present invention.

FIG. 1 is a schematic view illustrating an example of a sectional structure of a fuel cell unit using gas diffusion electrodes according to the present invention. The fuel cell unit illustrated in FIG. 1 has a structure in which, on one side of a membrane electrode assembly (MEA) 14, an anode-side separator 4 and an anode-side collecting plate 5 are successively arranged, and on another side of the MEA 14, a cathode-side separator 6 and a cathode-side collecting plate 7 are successively arranged. The MEA 14 has a structure in which a polymer electrolyte membrane (hereinafter, merely referred to as "electrolyte membrane" in some cases) 1 is sandwiched by an anode-side gas diffusion electrode 2 and a cathode-side gas diffusion electrode 3.

In the fuel cell according to this example, hydrogen is supplied to the anode-side gas diffusion electrode 2 and air or oxygen is supplied to the cathode-side gas diffusion electrode 3. Accordingly, the anode-side gas diffusion electrode and the cathode-side gas diffusion electrode may be referred to as hydrogen electrode and air electrode (or oxygen electrode), respectively.

The anode-side gas diffusion electrode 2 of this example includes, from a side close to the electrolyte membrane 1, a catalyst layer 10, a conductive fine particle layer (hereinafter, referred to as "microporous layer (MPL)" in some cases. Note that, the conductive fine particle layer is a superordinate concept of the above-mentioned carbon fine particle layer.) 9, and a layer 8 formed of conductive fibers (hereinafter, referred to as "conductive fiber layer" in some cases.), which are laminated to each other in the stated order.

On the other hand, the cathode-side gas diffusion electrode 3 of this example includes, from a side close to the electrolyte membrane 1, a conductive fiber layer 11 and the MPL 9 which are laminated in the stated order. The conductive fiber layer 11 is divided into a region 12 which carries a catalyst (hereinafter, referred to as "catalyst carrying layer" in some cases) and a region 13 which does not carry the catalyst (hereinafter, referred to as "no-catalyst carrying layer"). In this example, the conductive fiber layer 11 of the catalyst carrying layer 12 directly carries the catalyst. Further, each of both the conductive fiber layer 11 and the MPL 9 contains a fluorine-based resin as a hydrophobic agent.

That is, in this example, only the cathode-side gas diffusion electrode is the gas diffusion electrode of the present invention. As a matter of course, the arrangement structure of the gas diffusion electrodes is not limited thereto. For example, both the electrodes may be the gas diffusion electrodes of the present invention. Alternatively, only the anode-side gas diffusion electrode may be the gas diffusion electrode of the present invention. Since flooding tends to occur in the gas diffusion electrode on the cathode-side, in which water is produced, at least the cathode-side gas diffusion electrode can be the gas diffusion electrode.

Next, a description will be made of a material of each of components.

As a material for the separators 4 and 6, there is suitably used a material having excellent conductivity and acid resistance. Specific examples of the suitable materials can include carbon, stainless steel (SUS), SUS coated with gold, SUS coated with carbon, aluminum coated with gold, and aluminum coated with carbon.

Further, as a material for the collecting plates 5 and 7, there is suitably used a material having excellent conductivity and oxidation resistance. Specific examples of the suitable materials can include, like in the case of the separator, carbon, stainless steel (SUS), SUS coated with gold, SUS coated with carbon, aluminum coated with gold, and aluminum coated with carbon. Note that, the separator and the collecting plate can be integrated with each other.

For the polymer electrolyte membrane 1, there is suitably used a material through which protons ($H^+$) can easily move from the anode side toward the cathode side. In a case where the protons move through the electrolyte membrane toward the cathode side, the protons move in a hydrophilic portion in the electrolyte by using water molecules as media. Accordingly, the polymer electrolyte membrane can also have a function of retaining the water molecules (water retaining function). Further, the polymer electrolyte membrane can prevent passage of an unreacted reactant gas (hydrogen and oxygen) therethrough.

For the polymer electrolyte membrane 1, from materials having those functions, any material can be selected to be used in consideration to various conditions.

Examples of the material can include a polymer having a sulfonic group and a polymer having a phosphate group. Of those, a perfluoro carbon polymer having the sulfonic group can be suitably used. An example of a perfluoro sulfonic acid polymer include Nafion (registered trademark, manufactured by DuPont).

As described above, the cathode-side gas diffusion electrode 3 according to this example includes, from a side close to the electrolyte membrane 1, the conductive fiber layer 11 and the MPL 9 which are laminated in the stated order. Further, the conductive fiber layer 11 is divided into the region (catalyst carrying layer) 12 which carries the catalyst on the side close to the electrolyte membrane 1, and the region (no-catalyst carrying layer) 13 which does not carry the catalyst on the side far from the electrolyte membrane 1. That is, the cathode-side gas diffusion electrode 3 of this example is the gas diffusion electrode of the present invention.

Hereinafter, the gas diffusion electrode according to the exemplary embodiment of the present invention will be described by taking the cathode-side gas diffusion electrode 3 as an example.

First, as the MPL 9, a layer formed of carbon fine particles is suitably used. Specifically, a porous and water repellent conductive body including a mixture of the carbon fine particles and a water repellent resin can be the MPL. For the carbon fine particles, there may be used, for example, Ketjen black, acetylene black, carbon nanotube, carbon nano fiber, needle-like graphite, or a mixture thereof.

In general, the MPL is obtained by applying a slurry including the carbon fine particles, the water repellent resin such as PTFE, a surfactant, and a solvent to the conductive fiber layer, sintering the resultant at 350 to 380° C., and removing the surfactant and the solvent. As a method of applying the slurry, a screen printing method or a spray coating method can be used.

Therefore, an interface between the MPL 9 and the conductive fiber layer is not always definite. The MPL partially intrudes into the conductive fiber layer in many cases.

The MPL 9 functions to interrupt discharge of a product water, thereby enabling moisture retention in the electrolyte membrane of the MEA.

The thicker the MPL is, the larger an effect of retaining moisture of the electrolyte membrane becomes.

However, at the same time, a water discharge amount from the gas diffusion electrode is reduced, thereby causing the flooding to easily occur. In view of achieving both the moisture retention of the electrolyte membrane and prevention of the flooding, a thickness of the MPL is desirably about 40 to 180 µm, and is more desirably in a range of 60 to 100 µm.

Further, the MPL 9 has an effect of making the product water less likely to remain in the interface between the gas diffusion electrode 3 and the separator 6. This is because, since the MPL 9 exists while coming into contact with the separator 6, the product water condensed in the interface between the gas diffusion electrode and the separator becomes water droplets, and thus an evaporation area per water volume becomes larger, so the evaporation becomes easier.

Further, in a general structure, surfaces of the gas diffusion electrodes, opposed to separator flow paths (open portions existing in the separators 4 and 6 of FIG. 1) are fibrous and have irregularities. On the other hand, in the structure of the present invention, relatively smooth MPL surfaces are opposed to the separator flow paths. Therefore, an area of the interface covered by the water droplets of the product water is smaller than that of the related art. Thus, even when a flow rate of air flowing through the separator flow paths is relatively small, the water droplets can be removed, thereby making the flooding be not likely to occur.

The cathode-side gas diffusion electrode 3 is obtained by laminating the MPL 9 onto one surface of the conductive fiber layer 11 and depositing the catalyst on a surface of the conductive fiber layer 11 opposite to MPL 9, thereby making a part of the conductive fiber layer 11 be the catalyst carrying layer 12.

Specifically, after the MPL 9 is laminated onto the conductive fiber layer 11, on the surface of the conductive fiber layer 11 opposite to the MPL 9, the catalyst is formed by sputtering, an ion plating method, or the like, thereby forming the catalyst carrying layer 12 and the no-catalyst carrying layer 13 in the conductive fiber layer 11. A thickness of the catalyst carrying layer 12 can be 20 µm or more.

In forming the catalyst, an oxide of the catalyst can be deposited on the conductive fiber layer by reactive sputtering (oxidation reactive sputtering) or reactive ion plating performed in an oxidization atmosphere. In this case, after the deposition, a reduction treatment of the catalyst oxide is performed, thereby obtaining the catalyst carrying layer 12 carrying catalyst metal. In this case, the catalyst oxide is a catalyst precursor. As a result, compared to a case where non-reactive sputtering is used, the catalyst having a large specific surface area is obtained. As the catalyst oxide, platinum oxide (oxide of platinum) or a composite oxide of platinum and another metal can be favorably used.

As the favorable catalyst obtained by the above-mentioned method, there is a catalyst having a dendritic structure as disclosed in Japanese Patent Application Laid-Open No. 2006-049278.

In order to add a hydrophobic agent to the catalyst carrying layer 12 as described above, it is particularly desirable that a commonly known technology as described in Japanese Patent Application Laid-Open No. 2006-332041 be used. In this method, a Si compound containing a hydrophobic substituent group which causes a hydrolysis reaction by a catalyst action of platinum oxide to produce a polymerizable group is brought into contact with the platinum oxide, and after that, the Si compound is subjected to polymerization reaction in the vicinity of the platinum oxide, thereby generating the hydrophobic agent on the platinum oxide surface, and after that, the platinum oxide is reduced. By this method, the hydrophobic agent including methyl siloxane or the like can be simply added only to the catalyst layer of the catalyst carrying layer 12.

It is also possible to use a related-art hydrophobic method in which the gas diffusion electrode is immersed in a fluorine resin solution. However, in this case, the fluorine resin is newly added also to the MPL 9 and the no-catalyst carrying layer 13, and the pores are clogged by an amount corresponding to the newly added resin, so gas diffusibility is reduced to some degree. In order to prevent this, the method as disclosed in Japanese Patent Application Laid-Open No. 2006-332041 is more desirably employed.

A thickness of the no-catalyst carrying layer 13 is desirably 15 μm or more, and is more desirably 30 μm. A thickness of the no-catalyst carrying layer 13 is set to 15 μm or more, thereby enabling suppressing the flooding in the gas diffusion electrode. The thickness thereof is set to 30 μm or more, thereby enabling suppressing the flooding more reliably.

For the conductive fiber layer 11, a woven cloth or a non-woven cloth made of carbon fibers may be suitably used. A member having a structure in which carbon fine particles having the same composition as that of MPL are arranged between the carbon fibers may be desirably used. For the conductive fiber layer 11, there can desirably used, for example, carbon cloth, carbon paper, or a sheet-like material, in which resin nanofibers formed by an electro spinning method are carbonized, and with which a water repellent resin such as PTFE is impregnated.

The conductive fiber layer 11 can have spaces having a mode diameter of 10 μm to 100 μm in a region thereof from at least a one-side surface to a depth of at least 20 μm. In a case where the conductive fiber layer has the above-mentioned spaces, catalyst particles can be carried by the conductive fiber layer existing at a depth of 20 μm or more from the surface of the conductive fiber layer. When the gas diffusion electrode 3 has spaces having a mode diameter of only 10 μm or less, the catalyst can be carried only in the vicinity of the surface of the gas diffusion electrode 3. Accordingly, the effect of the present invention is small.

Conversely, when the conductive fiber layer 11 has spaces having a mode diameter of 100 μm or more, the catalyst is carried by a portion from the surface of the conductive fiber layer 11 to a deep portion thereof. Accordingly, a thickness of the no-catalyst carrying layer 13 is reduced.

In view of allowing the spaces having the mode diameter of 10 μm or more to be formed in the conductive fiber layer 11, each of the conductive fibers constituting the conductive fiber layer 11 can have a diameter of 1 μm to 10 μm.

In a case where air or oxygen is used as the oxidizer, the catalyst included in the catalyst carrying layer 12 functioning as the cathode-side catalyst layer is required of an ability of reducing the oxygen.

As a material of the catalyst having the above-mentioned function, there can be suggested platinum, or an alloy of a platinum group metal such as rhodium, ruthenium, iridium, palladium, or osmium and platinum. Further, as a shape of the catalyst, there can be suggested a dendrite shape or an aggregate of fine particles each having a diameter of 2 to 10 nm.

In the gas diffusion electrode according to the present invention, as described above, the conductive fiber layer 11 is divided into the catalyst carrying layer 12 in which the catalyst is carried on the carbon fibers and the no-catalyst carrying layer 13, and the MPL 9 is brought into contact with the no-catalyst carrying layer 13. In other words, the gas diffusion electrode according to the present invention is characterized in that the MPL is provided on the separator side, that is, a gas supply side of the conductive fiber layer 11.

Since the gas diffusion electrode is structured as described above, water produced in the catalyst carrying layer 12 is led to the no-catalyst carrying layer 13 to be retained therein, and is then discharged to the separator side after passing through pores of the MPL 9. That is, the no-catalyst carrying layer 13 functions as a buffer for the product water.

By the existence of the no-catalyst carrying layer 13, an area increases in which the product water condensed in the catalyst layer can be evaporated without covering the catalyst layer. Accordingly, in the gas diffusion electrode according to the present invention, the flooding does not easily occur.

In a case where the no-catalyst carrying layer 13 does not exist, that is, a case where the catalyst carrying layer 12 and the MPL 9 are brought into direct contact with each other, all water condensed in the catalyst layer covers the catalyst layer until the water is evaporated again. Accordingly, an amount of the catalyst to which gas supply is interfered increases, thereby leading to a risk of reducing the fuel cell voltage.

Further, in the catalyst carrying layer 12 as described above, a catalyst deposition area per electrode area is larger than that of a general gas diffusion electrode according to the related art. Accordingly, in a case where the same amount of catalyst is carried, an average thickness of the catalyst layer can be made smaller than that of the related art. That is, in the case where the amount of the carried catalyst is the same, water in the gas diffusion electrode according to the present invention is discharged rapidly from pores in an inner portion of the catalyst layer compared to the related-art gas diffusion electrode. Accordingly, the flooding is less likely to occur than in the related-art gas diffusion electrode.

Further, conventionally, a drainage path from the catalyst layer is provided in a membrane thickness direction. However, in the gas diffusion electrode according to the present invention, the catalyst layer is carried by the conductive fibers to constitute the catalyst carrying layer. Accordingly, the drainage path constitutes a surface of the catalyst layer. Specifically, along the interface between the fibers and the space in the catalyst carrying layer, the catalyst layer exists. Further, the MPL is a hydrophobic porous body. Accordingly, in the related-art structure, in order to move the product water from the catalyst layer to the MPL, a large pressure force for pushing water into the hydrophobic pores of the MPL is required. On the other hand, in the gas diffusion electrode according to the present invention, water is moved on the surface of the catalyst layer to be discharged, so a moving resistance of the water to the no-catalyst carrying layer 13 is small. Therefore, water is rapidly discharged from the catalyst layer.

Thus, in the gas diffusion electrode according to the present invention, a product water does not tend to remain in the catalyst layer.

On the other hand, as described above, in this example, as the anode-side gas diffusion electrode 2, there is used an electrode in which the catalyst layer 10, the microporous layer (MPL) 9, and the conductive fiber layer 8 are laminated to each other. This is a relatively general electrode, and for the catalyst layer 10, the MPL 9, and the carbon fiber layer 8, which are components of the electrode, various general materials can be appropriately selected to be used.

The anode-side catalyst layer 10 suitably used in this example is a porous layer formed of a catalyst and a proton conductive electrolyte.

In a case where hydrogen is used as the fuel, the catalyst included in the anode-side catalyst layer 10 is required of an ability of oxidizing the hydrogen.

As a material of the catalyst having the above-mentioned function, there can be suggested platinum, or an alloy of a platinum group metal such as rhodium, ruthenium, iridium, palladium, or osmium and platinum. Further, as a shape of the catalyst, there can be suggested a dendrite shape or an aggregate of fine particles each having a diameter of 2 to 10 nm.

As a manufacturing method for the anode-side catalyst layer 10, there can be suggested a method in which a slurry including a proton conductive electrolyte and a solvent is applied onto a sheet made of PTFE or the like and is dried, and then, catalyst fine particles are dispersed and carried on the carbon fine particles are heat transferred to the polymer electrolyte membrane 1. In this case, it is more desirable that a water repellent agent made of PTFE or the like be mixed therein. As an application method for the slurry, there can be adopted a screen printing method or a spray coating method.

In order to allow the fuel cell reaction to be effectively performed, both the anode-side fiber layer 8 and the MPL 9 serve to sufficiently supply a fuel gas to an electrode reaction region of a fuel electrode uniformly in a surface thereof and to allow a current load generated by an anode electrode reaction to be released to the outside of the fuel cell unit.

Further, the anode-side fiber layer 8 and the MPL 9 also serve to discharge the product water, which passes through the membrane due to back diffusion from the gas diffusion electrode on the cathode side, to the outside of the fuel cell unit.

The anode-side fiber layer 8 is a porous conductive body formed of the conductive fibers and the hydrophobic resin. As the conductive fibers, carbon fibers can favorably be used. Further, other than the carbon fibers, foamed metal or metal fibers may be used.

A specific example of the fiber layer 8 to be used includes a member in which, with a sheet-like material obtained by carbonizing carbon cloth, carbon paper, or resin nanofibers formed by the electro spinning method, PTFE is impregnated.

Note that a member in which carbon fine particles having the same composition as that of the MPL are arranged between the conductive fibers in the fiber layer 8 can be desirably used.

As a manufacturing method for the fuel cell unit using the gas diffusion electrodes according to the present invention, various methods are suggested. In this case, by taking a case of the structure illustrated in FIG. 1 as an example, the example will be described below. Note that the present invention is not limited to the following manufacturing method.

(1) A cathode-side gas diffusion electrode is manufactured.

As a gas diffusion electrode substrate, there is prepared hydrophobically-treated carbon paper having the MPL layer 9 formed on one surface thereof. On a surface on a carbon fiber layer side of the carbon paper, there is formed a porous platinum oxide layer by a reactive sputtering method. Subsequently, according to a commonly known technology described in Japanese Patent Application Laid-Open No. 2006-332041, a catalyst layer is made hydrophobic. That is, the porous platinum oxide layer thus obtained is brought into contact with a gas of a Si compound including a hydrophobic substituent group, thereby forming a hydrophobic agent on a surface of a catalyst. After that, by heating, polymerization reaction of the hydrophobic agent may be promoted.

(2) A platinum oxide layer is reduced.

Next, the gas diffusion electrode is put in a hydrogen atmosphere, and the platinum oxide layer is reduced to form the cathode-side catalyst carrying layer 12, thereby obtaining the cathode-side gas diffusion electrode (integrated body of a portion denoted by reference numeral 11 and a portion adjacent thereto denoted by reference numeral 9 of FIG. 1).

After that, to the gas diffusion electrode thus obtained, an appropriate amount of a Nafion solution (5 wt %, manufactured by Wako Pure Chemical Industries, Ltd.) which is diluted is dropped. A solvent is then volatilized in a vacuum, thereby forming a proton path on the catalyst surface.

(3) A catalyst layer sheet for an anode is prepared.

On a PTFE sheet, a platinum carrying carbon catalyst layer is formed by using a doctor blade, thereby preparing a catalyst layer sheet for an anode. A thickness of the catalyst layer can be in a range of 20 to 40 µm. A catalyst slurry used in this case is a mixture of platinum carrying carbon (manufactured by Johnson Matthey, HiSPEC 4000), Nafion, PTFE, isopropyl alcohol (IPA), and water.

(4) An MEA is prepared.

By the cathode-side gas diffusion electrode and the catalyst layer sheet for an anode obtained by Steps (2) and (3), respectively, the polymer electrolyte membrane (manufactured by DuPont, Nafion 112) 1 is sandwiched to perform hot press. Further, after the PTFE sheet of the catalyst layer sheet for an anode is removed, carbon cloth having the MPL (manufactured by E-TEK, LT 1400-W: integrated body of a portion denoted by reference numeral 8 and a portion adjacent thereto denoted by reference numeral 9 of FIG. 1) is overlapped with the anode-side catalyst layer. As a result, the MEA 14 is obtained in which the gas diffusion electrode according to the present invention is provided to a cathode.

(5) A fuel cell unit is manufactured.

The MEA 14 prepared in Step (4) is sandwiched by the carbon separators 4 and 6, and the collecting plates 5 and 7, respectively, as illustrated in FIG. 1, thereby manufacturing the fuel cell unit.

The present invention is not limited to the polymer electrolyte fuel cell having the fuel cell unit structure. The present invention may be applied to a polymer electrolyte fuel cell having a structure in which plural fuel cell units are stacked on each other.

Next, specific examples are illustrated to describe the present invention in detail.

Example 1 and Comparative Example 1

In Example 1, a polymer electrolyte fuel cell having a structure illustrated in FIG. 1 of the embodiment is manufactured.

Hereinafter, a detailed description is made of a manufacturing step of the polymer electrolyte fuel cell according to this example.

(Step 1)

As a substrate of a gas diffusion electrode for a cathode, carbon paper (manufactured by E-TEK, LT 1200-N) was used. LT 1200-N has a structure in which a one surface of a carbon fiber layer is applied with an MPL and on another surface the carbon fiber layer is exposed to an outside. The carbon fiber layer is made of the carbon paper. However, between the carbon fibers, like in the MPL, a microporous portion formed of carbon fine particles and a fluorine resin exists.

On a surface of LT 1200-N, formed of the carbon fiber layer, there was formed a porous platinum oxide layer by a reactive sputtering method. The reactive sputtering was performed under conditions of a total pressure of 5 Pa, an oxygen flow rate of ($Q_{O2}/(Q_{Ar}+Q_{O2})$) 85%, a substrate temperature of 25° C., and an RF input power of 5.4 W/cm².

(Step 2)

Subsequently, according to the commonly known technology described in Japanese Patent Application Laid-Open 2006-332041, a composite of the porous platinum oxide layer and the carbon paper was brought into contact with vapor (partial pressure of 0.05 Pa) of 2,4,6,8-tetramethyl-cyclotetrasiloxane at 25° C. for 5 minutes. As a result, a methylsiloxane polymer was prepared on the platinum oxide surface.

The obtained catalyst layer was then reduced in a 2% $H_2$/He atmosphere of 0.1 MPa for 30 minutes, thereby obtaining a porous platinum catalyst layer-gas diffusion layer composite. A Pt carrying amount was 0.6 mg/cm².

Figure 2:
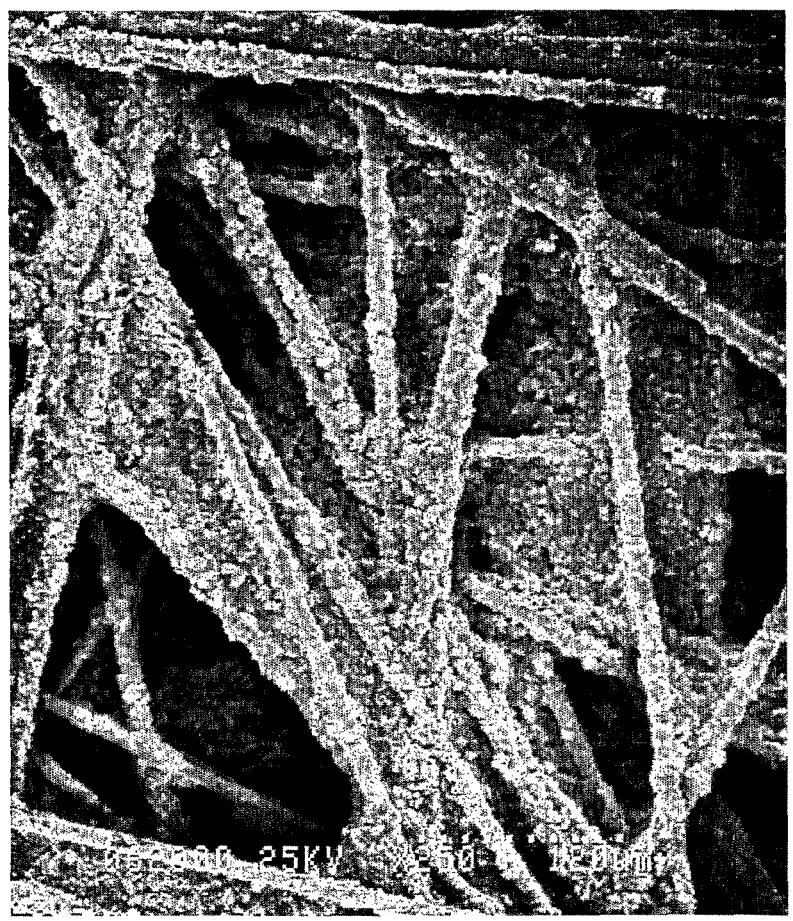
FIG. 2 is a scanning electron micrograph illustrating a structure of the gas diffusion electrode according to Example 1 of the present invention (magnification of 250 times: a length between a left end and a right end of a white-dot group in a lower right portion of the figure is 120 μm).
Figure 3:
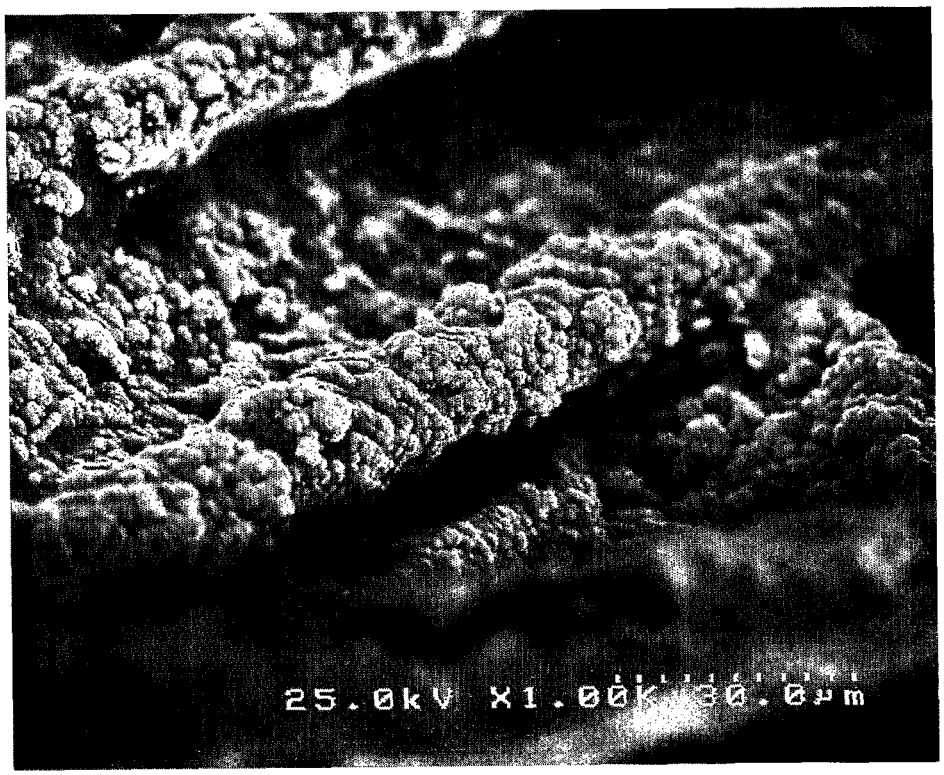
FIG. 3 is a scanning electron micrograph illustrating a structure of the gas diffusion electrode according to Example 1 of the present invention (magnification of 1000 times: a length between a left end and a right end of a white-dot group in a lower right portion of the figure is 30 μm).
Figure 4:
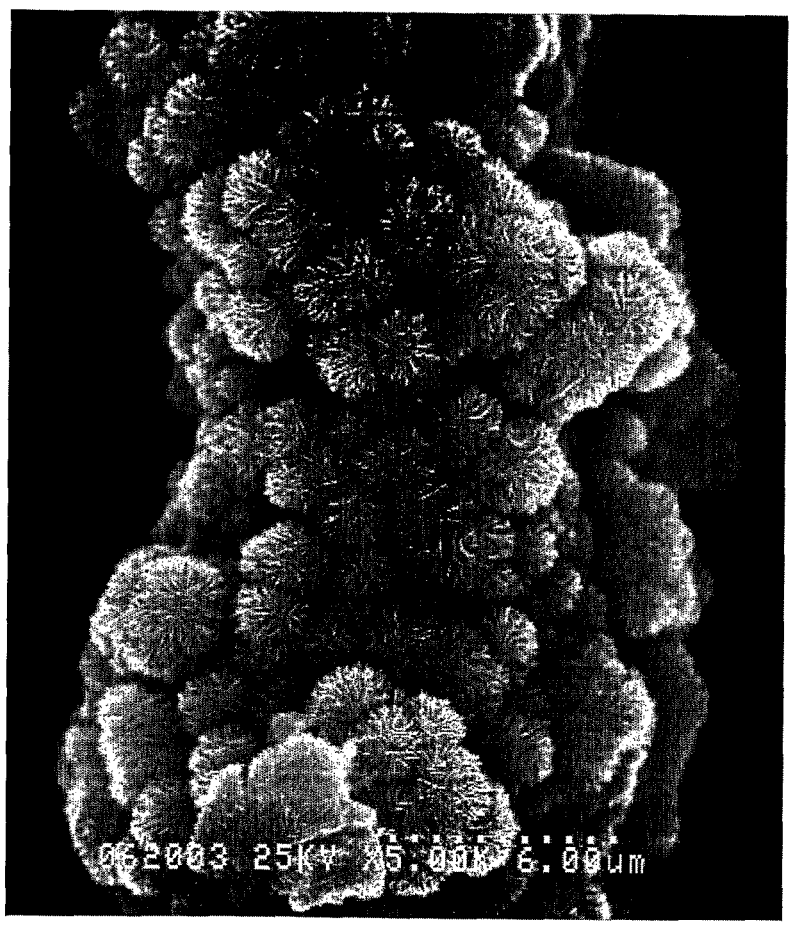
FIG. 4 is a scanning electron micrograph illustrating a structure of the gas diffusion electrode according to Example 1 of the present invention (magnification of 5000 times: a length between a left end and a right end of a white-dot group in a lower right portion of the figure is 6 μm).

A state where the porous platinum catalyst layer is carried by the carbon fibers of the carbon paper is illustrated in scanning electron micrographs of FIGS. 2 to 4. A member which appears white in each of FIGS. 2 to 4 is the platinum catalyst.

FIG. 2 is the scanning electron micrograph at a magnification of 250 times, illustrating a structure of catalyst carrying carbon paper obtained in (Step 2). FIGS. 3 and 4 each illustrate a surface portion thereof while enlarging the surface portion (at a magnification of 1000 times in FIG. 3, and at a magnification of 5000 times in FIG. 4). As understood from FIGS. 3 and 4, the platinum catalyst was carried so as to cover the carbon fibers and the microporous portion in the fiber layer, and formed the porous catalyst layer.

Figure 5:
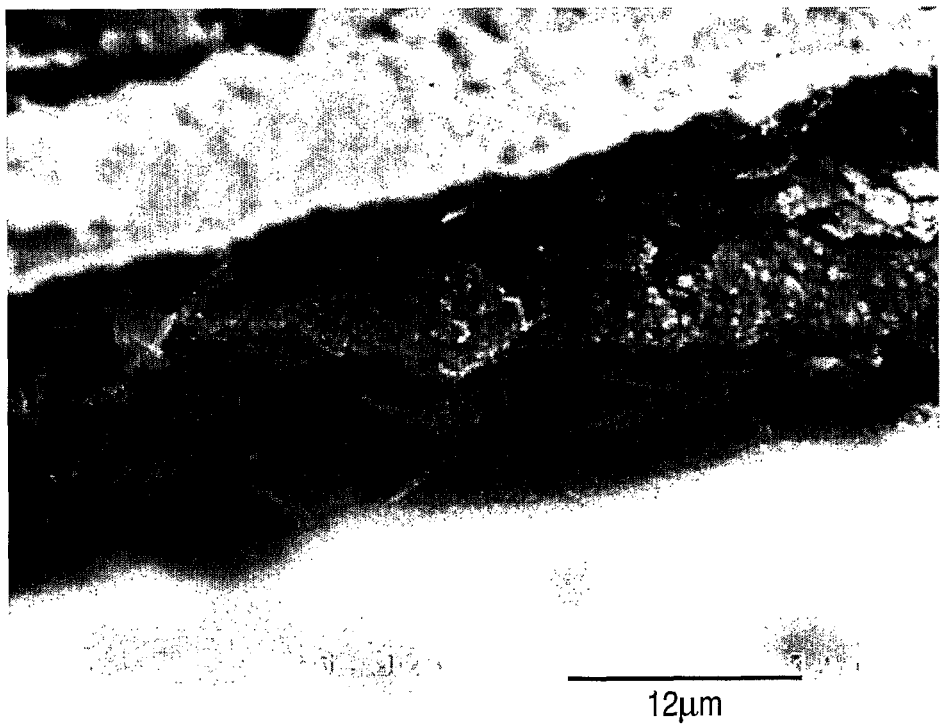
FIG. 5 is a scanning electron micrograph illustrating a structure of the gas diffusion electrode according to Example 1 of the present invention (magnification of 3000 times: a length between a left end and a right end of a black line in a lower right portion of the figure is 12 μm).
Figure 6:
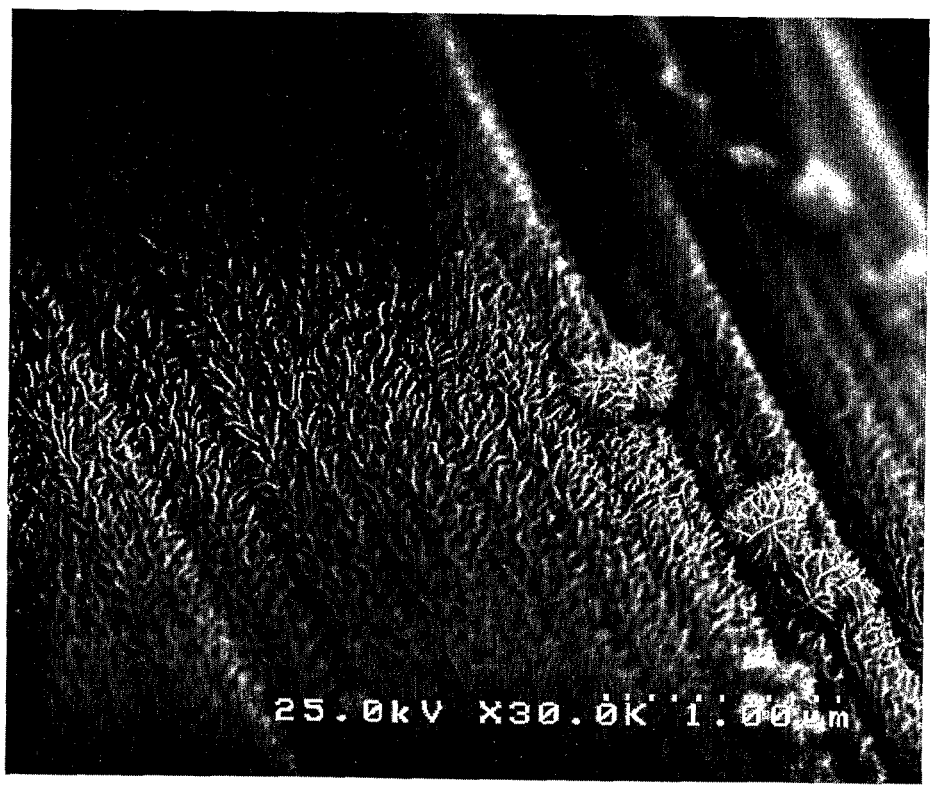
FIG. 6 is a scanning electron micrograph illustrating a structure of the gas diffusion electrode according to Example 1 of the present invention (magnification of 30000 times: a length between a left end and a right end of a white-dot group in a lower right portion of the figure is 1 μm).

Further, FIGS. 5 and 6 are scanning electron micrographs illustrating a state of an inner side of a space of the carbon paper obtained in (Step 2). It is understood that the catalyst is carried not only by the carbon fibers in the vicinity of the surface, which appears in a front portion, but also by the carbon fibers in an inner portion of the space. In FIG. 5 (magnification of 3000 times), a part of the carbon fibers seems not to be covered with the catalyst. However, through observation with the micrograph being enlarged, FIG. 6 (magnification of 30000 times) confirmed that, as illustrated therein, the thin porous platinum catalyst layer was also formed on this part.

Further, by observing the inner portion of the space of FIG. 5 including the deep portion thereof, it was found that the inner portion of the space was covered with the platinum catalyst all the way to a bottom portion thereof and the platinum catalyst was carried in the space even at a depth of about 80 μm from the fiber layer surface. Note that, in the bottom portion of the space, a thickness of the catalyst layer was relatively thin.

A thickness of LT 1200-N is about 210 μm, a thickness of the catalyst carrying layer is about 80 μm, and a thickness of the MPL is about 80 μm. Accordingly, a thickness of the no-catalyst carrying layer in the gas diffusion electrode is estimated to be about 50 μm.

After that, 8 μl of a 1 wt % Nafion solution (5% solution manufactured by Wako Pure Chemical Industries, Ltd. diluted with isopropanol to 1%) per catalyst area of 1 cm² was dropped onto the obtained gas diffusion electrode, and a solvent was volatilized in a vacuum, thereby forming a proton path on the catalyst surface.

In this manner, there was obtained the gas diffusion electrode of a structure in which the catalyst carrying layer and the no-catalyst carrying layer were provided in the fiber layer and the MPL was provided while being brought into contact with the no-catalyst carrying layer.

(Step 3)

In order to prepare the anode-side catalyst layer, the platinum carrying carbon layer was formed to have a thickness of about 20 μm on the PTFE sheet by a doctor blade method. The catalyst slurry used in this case is a mixture of 1 mass portion of platinum carrying carbon (manufactured by Johnson Matthey, HiSPEC 4000), 0.07 mass portion of Nation, 1 mass portion of IPA, and 0.4 mass portion of water. In this case, a Pt carrying amount was 0.3 mg/cm².

(Step 4)

The gas diffusion electrode having the cathode-side catalyst carrying layer prepared in (Step 2) and the PTFE with the anode-side catalyst layer (platinum carrying carbon layer) prepared in (Step 3) were cut out to have an area of 4 cm². The polymer electrolyte membrane (manufactured by DuPont, Nafion 112) was sandwiched therebetween such that the catalyst carrying layer and the platinum carrying carbon layer are located inside, and hot press was performed under press conditions of 4 MPa, 150° C., and 10 min. After that, the PTFE sheet was removed from the platinum carrying carbon layer.

(Step 5)

A surface on the MPL side of a GDL having the MPL (manufactured by E-TEK, LT 1200-W) was laminated so as to be brought into contact with the anode-side catalyst layer of the MEA prepared in (Step 4), thereby forming the MEA. Further, the MEA was sandwiched by the carbon separator arranged as illustrated in FIG. 1, thereby preparing a fuel cell unit.

According to Comparative Example 1, in (Step 1), except that the surface on the MPL side of the carbon paper is formed with a porous platinum oxide layer by the sputtering, the fuel cell unit prepared in the same manner was prepared, and a power generation test was performed under the same conditions. The Pt carrying amount of the porous platinum catalyst layer was 0.6 mg/cm² as in Example 1.

In Comparative Example 1, the MPL serving as a catalyst deposition surface had a small pore diameter. Accordingly, almost no platinum oxide particles which were sputtered intrudes into the MPL. As a result, the porous platinum catalyst layer was formed to have a thickness of about 2 μm on the MPL surface in a layer-like fashion.

A hydrogen gas was supplied in a dead-ended mode to an anode-side separator of the fuel cell unit prepared in the above-mentioned steps, and air was supplied to a cathode-side separator at predetermined humidity and airflow rate. The power generation test was performed at a cell temperature of 40° C.

Figure 7:
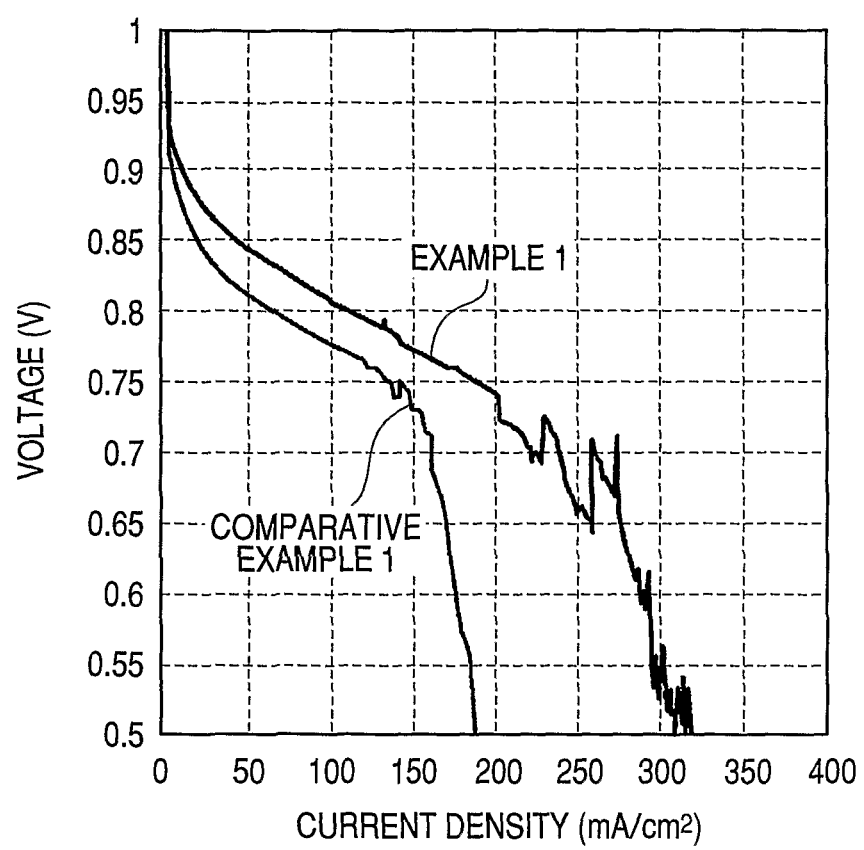
FIG. 7 is a graph illustrating current-voltage characteristics of each of polymer electrolyte fuel cells according to Example 1 and Comparative Example 1 of the present invention.

FIG. 7 illustrates current-voltage characteristics of the fuel cell, obtained in a case where air (40° C., relative humidity of 100%) was supplied to the cathode side in an amount of 70 ccm. A sweep rate of a current value was 0.1 mA/cm²/s.

In Example 1, an electrode area is 4 cm², so a condition where the airflow rate is 70 ccm corresponds to a state where 2.5 times an oxygen amount required for the power generation is supplied at 400 mA/cm². That is, under this condition, humidity of air flowing in is 100% and the airflow rate is relatively small, so the product water cannot be easily removed from the cathode, accordingly, flooding in the cathode easily occurs.

Further, under this condition, since the anode side is dead ended, water evaporation from the anode side does not occur. Further, the humidity of the supplied air on the cathode side is 100% RH, so the water evaporation amount from the cathode-side gas diffusion electrode is small. That is, under this condition, water movement to the outside of the fuel cell is suppressed, so the flooding in the cathode easily occurs.

Further, the sweep rate of the current value at the time of measurement is low, and a power generation time at a time of measurement becomes longer to produce a large amount of water. Accordingly, the flooding easily occurs in the fuel cell when a current density is high.

By making a comparison between the gas diffusion electrodes according to Example 1 and Comparative Example 1 under the condition where the flooding easily occurs, it is possible to evaluate to what extent each of the gas diffusion electrodes can tolerate the flooding.

In FIG. 7, a comparison was made between current densities at a time when a voltage was reduced to 0.5 V due to the flooding. The current density obtained by the fuel cell unit of Example 1 was 300 mA/cm$^2$ or more, and that of Comparative Example 1 was only 186 mA/cm$^2$. That is, the gas diffusion electrode of Example 1 was suppressed in voltage reduction resulting from diffusion polarization to a large degree compared to the gas diffusion electrode of Comparative Example 1, thereby suppressing the flooding.

Next, 20 sccm of a hydrogen gas was allowed to flow to the anode electrode side of the fuel cell unit, 40 sccm of a $N_2$ gas was allowed to flow to the cathode electrode side, and a cyclic voltammogram measurement was performed at a battery temperature of 80° C. As a result, a $H^+$ absorption area per unit electrode area of the cathode-side catalyst layer, that is, an effective surface area was measured.

The effective surface area per unit area (1 cm$^2$) of the electrode of the catalyst layer according to Example 1 was 168 cm$^2$, and the effective surface area of the catalyst layer according to Comparative Example 1 was 208 cm$^2$. That is, in Example 1, the effective surface area was about 81% of that of Comparative Example 1.

That is, although the gas diffusion electrode of Example 1 had the effective surface area smaller than that of Comparative Example 1, in the gas diffusion electrode of Example 1, the flooding was less likely to occur than in the gas diffusion electrode of Comparative Example 1, thereby enabling retention of a higher voltage.

This illustrates that the gas diffusion electrode of Example 1 can effectively form a three-phase interface, thereby enhancing stability in fuel cell output even under conditions in which the flooding easily occurs and increasing a catalyst utilization ratio.

Next, in order to make a comparison between power generation characteristics under a dried environment, air was supplied to the cathode side under conditions of 40° C., a relative humidity of 21%, and a flow rate of 600 ccm, and a continuous power generation test was performed at a current density of 450 mA/cm$^2$.

Under this condition, a dried air is supplied to the cathode side by a large blowing amount, so the gas diffusion electrodes are dried to easily occur dry out.

Under the above-mentioned condition, by making the comparison between the gas diffusion layers according to Example 1 and Comparative Example 1, it is possible to evaluate to what extent each of the gas diffusion electrodes tolerate the dry out.

Figure 8:
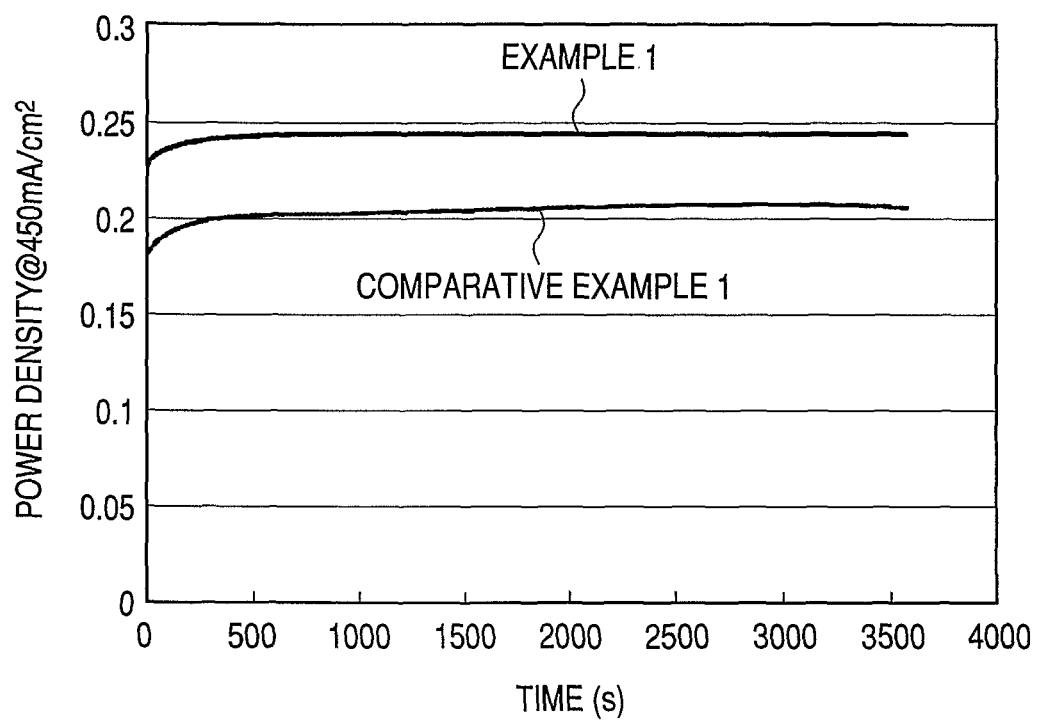
FIG. 8 is a graph illustrating a time change of each of the polymer electrolyte fuel cells according to Example 1 and Comparative Example 1 of the present invention.

FIG. 8 illustrates a time change of outputs of the fuel cell obtained as a result thereof. As illustrated in FIG. 8, in Example 1, an output of 240 mW/cm$^2$ was obtained, but in Comparative Example 1, only an output of 206 mW/cm$^2$ was obtained.

Further, an impedance measurement was performed at a current density of 450 mA/cm$^2$ to perform measurement for a solution resistance component Rs. The measurement results illustrated that the solution resistance component Rs according to Comparative Example 1 was 321 mΩ·cm$^2$, and that according to Example 1 was 286 mΩ·cm$^2$.

This indicates that the gas diffusion electrode of Example 1 is superior in moisture retention property than that of Comparative Example 1, so drying of the electrolyte is suppressed, and output loss due to inner resistance increase is suppressed.

Next, in order to check an output fluctuation with respect to a temperature/humidity fluctuation under a cathode-side environment, the temperature and the humidity were set to (1) 40° C. 100% RH, (2) 60° C. 100% RH, and (3) 40° C. 57% RH to perform a power generation test. Further, a cell temperature was set equal to a temperature of the air to be supplied to perform the measurement.

Figure 9:
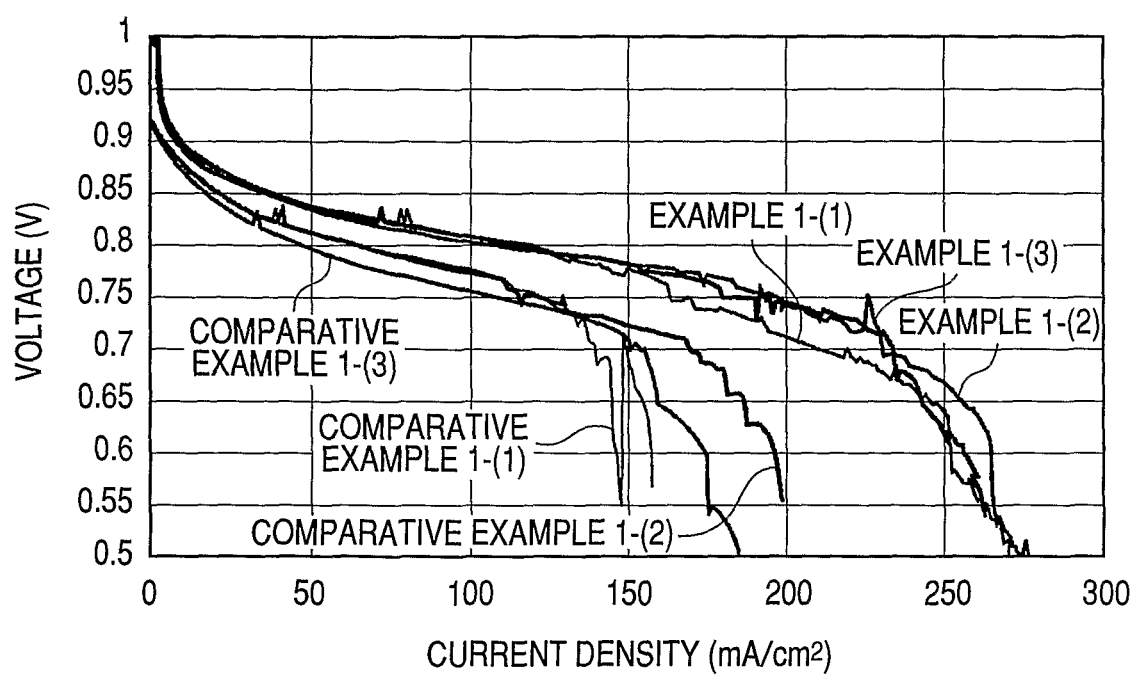
FIG. 9 is a graph illustrating current-voltage characteristic of each of the polymer electrolyte fuel cells according to Example 1 and Comparative Example 1 of the present invention.

FIG. 9 illustrates the current-voltage characteristics of the fuel cell, which were obtained with a flow rate of the air to be supplied on the cathode side being 70 ccm, a sweep rate of the current value being 10 mA/cm$^2$/s. Note that data under conditions of Item (1) is the same as that of FIG. 7.

As understood from FIG. 9, in Example 1, a voltage fluctuation in a case where the temperature/humidity fluctuates is larger than that in Comparative Example 1. Accordingly, it is perceived that a high voltage is continuously obtained with the same current density.

Further, under any condition, in the fuel cell unit of Example 1, a limiting current density is higher than in the fuel cell unit of Comparative Example 1.

This illustrates that the gas diffusion electrode of Example 1 has a higher output density than that of Comparative Example 1, and is higher in stability against the temperature/humidity fluctuation on the cathode side.

As described above, the gas diffusion electrode of Example 1 has not only a flooding suppression effect but also a preferable other effects for enhancing stability of the fuel cell, such as a moisture retention effect of the electrolyte membrane and stability against the temperature/humidity fluctuation of a cathode atmosphere.

Example 2

A fuel cell unit was prepared in completely the same manner as in Example 1 except that, as the substrate of each of the gas diffusion electrodes, there was used carbon paper (manufactured by Ballard Power Systems Inc., Avcarb 2120).

The Pt amount was 0.6 mg/cm$^2$ as in Example 1.

By observing the inner portion of the space of the gas diffusion electrode according to Example 2 including a deep portion thereof, it was found that the inner portion of the space was covered with a platinum catalyst all the way to a bottom portion thereof and the platinum catalyst was carried in the space even at a depth of about 80 μm from the fiber layer surface.

In this case, a thickness of Avcarb 2120 was about 260 μm, a thickness of the catalyst carrying layer was about 80 μm, and a thickness of the MPL was about 80 μm. Accordingly, a thickness of the no-catalyst carrying layer of the gas diffusion electrode according to this example was estimated to be about 100 μm.

Comparative Example 2

A fuel cell unit was prepared in completely the same manner as in Comparative Example 1 except that, as the substrate of each of the gas diffusion electrodes, there was used carbon paper (manufactured by Ballard Power Systems Inc., Avcarb 2120). The Pt amount was 0.6 mg/cm$^2$ as in Example 2.

Example 3

A fuel cell unit was prepared in completely the same manner as in Example 1 except that, as the substrate of each of the gas diffusion electrodes, there was used carbon paper (manufactured by Ballard Power Systems Inc., Avcarb 1120). The Pt amount was 0.6 mg/cm$^2$ as in Example 2.

By observing the inner portion of the space of the gas diffusion electrode according to Examples 2 and 3 including a deep portion thereof, it was found that the inner portion of the space was covered with a platinum catalyst all the way to a bottom portion thereof and the platinum catalyst was carried in the space even at a depth of about 80 μm from the fiber layer surface.

In this case, a thickness of Avcarb 1120 was about 200 μm, composition/thickness of the MPL were the same as those of Avcarb 2120. Accordingly, in the gas diffusion electrode of Example 3, a thickness of the catalyst carrying layer was about 80 μm and the thickness of the MPL was about 80 μm, a thickness of the no-catalyst carrying layer was estimated to be about 40 μm.

Comparative Example 3

A fuel cell unit was prepared in completely the same manner as in Comparative Example 1 except that, as the substrate of each of the gas diffusion electrodes, there was used carbon paper (manufactured by Ballard Power Systems Inc., Avcarb 1120). The Pt amount was 0.6 mg/cm$^2$ as in Example 2.

The fuel cell unit prepared in each of Examples 2 and 3 and Comparative Examples 2 and 3 was subjected to the power generation test, as in Example 1, at a cell temperature of 40° C. by supplying a hydrogen gas to the anode-side separator by the dead-ended mode and by supplying air to the cathode-side separator at predetermined temperature/humidity and airflow rate.

Figure 10:
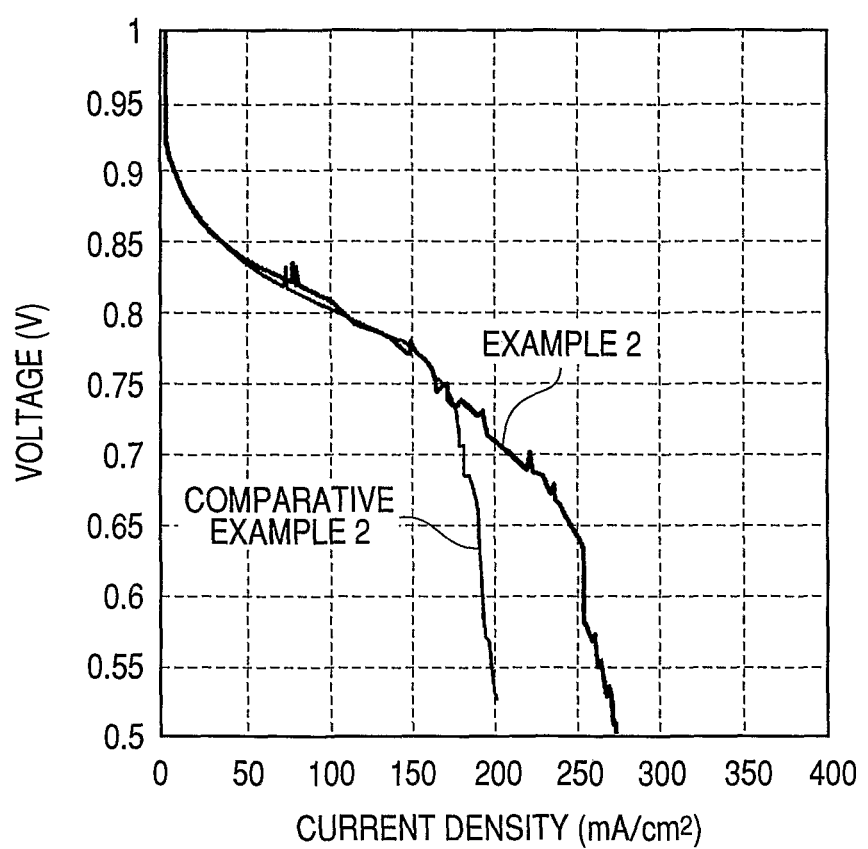
FIG. 10 is a graph illustrating current-voltage characteristics of each of polymer electrolyte fuel cells according to Example 2 and Comparative Example 2 of the present invention.

FIG. 10 illustrates current-voltage characteristics of the fuel cell unit according to each of Example 2 and Comparative Example 2, which were obtained in a case where air (40° C., relative temperature 100%) was supplied to the cathode side. Further, FIG. 11 illustrates current-voltage characteristics of the fuel cell unit according to each of Example 3 and Comparative Example 3 under the same conditions as described above.

In this case, a sweep rate of the current value was 0.1 mA/cm$^2$/s. Under this condition, the flooding easily occurs.

In FIG. 10, when a comparison was made between current densities at a time when a voltage was reduced to 0.5 V due to the flooding. The current density obtained by the fuel cell unit of Example 2 was about 270 mA/cm$^2$, and that of Comparative Example 2 was only about 200 mA/cm$^2$. That is, the gas diffusion electrode of Example 2 was suppressed in voltage reduction resulting from diffusion polarization to a large degree compared to the gas diffusion electrode of Comparative Example 2, thereby suppressing the flooding.

Figure 11:
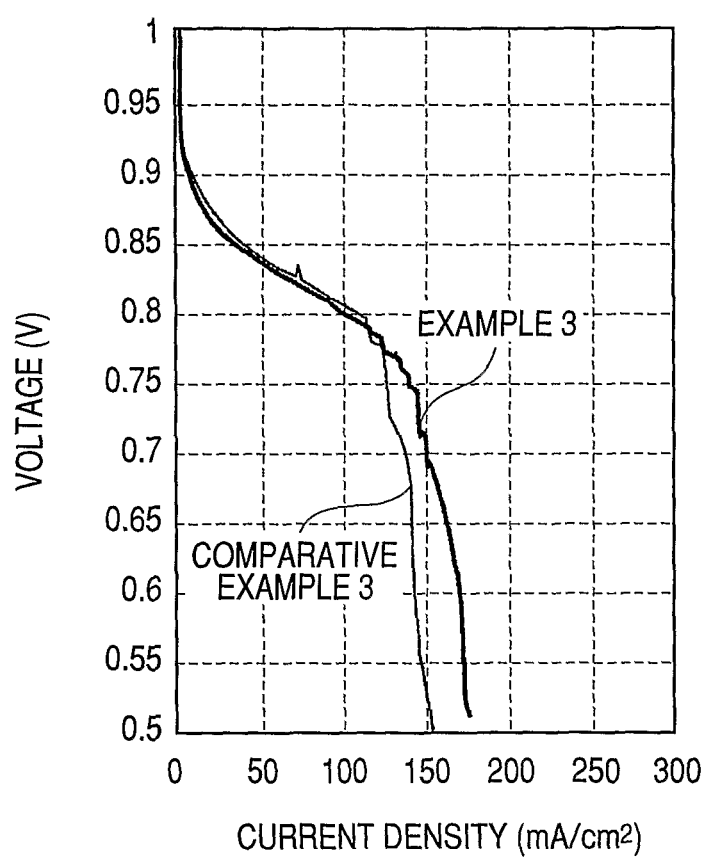
FIG. 11 is a graph illustrating current-voltage characteristics of each of polymer electrolyte fuel cells according to Example 3 and Comparative Example 3 of the present invention.

In FIG. 11, when a comparison was made between current densities at a time when a voltage was reduced to 0.5 V due to the flooding. The current density obtained by the fuel cell unit of Example 3 was about 170 mA/cm$^2$, and that of Comparative Example 3 was only about 150 mA/cm$^2$. That is, the gas diffusion electrode of Example 3 was suppressed in voltage reduction resulting from diffusion polarization to a large degree compared to the gas diffusion electrode of Comparative Example 3, thereby suppressing the flooding.

Next, in the same manner as Example 1, an effective surface area per unit area (1 cm$^2$) of the electrode of the catalyst layer according to each of Examples 2 and 3 and Comparative Examples 2 and 3 was measured. The effective surface area was 146 cm$^2$ in Example 2, 151 cm$^2$ in Example 3, 192 cm$^2$ in Comparative Example 2, and 201 cm$^2$ in Comparative Example 3.

That is, although the gas diffusion electrode of each of Examples 2 and 3 had the effective surface area smaller than that of each of Comparative Examples 2 and 3, in the gas diffusion electrode of each of Examples 2 and 3, the flooding was less likely to occur than in the gas diffusion electrode of each of Comparative Examples 2 and 3, thereby enabling retention of a higher voltage.

This illustrates that the gas diffusion electrode of each of Examples 2 and 3 can effectively form a three-phase interface, thereby enhancing stability in fuel cell output even under conditions in which the flooding easily occurs and increasing the catalyst utilization ratio.

In this case, a comparison made between results of Examples 1 to 3 illustrates that, in Examples 1 and 2 in which the thickness of the no-catalyst carrying layer is 50 μm or more, the current density at the time when the voltage is 0.5 V is higher than that in Example 3. This illustrates a fact that, in the gas diffusion electrode according to the present invention, a thickness of the no-catalyst carrying layer can be at least 50 μm or more.

Note that although the thickness of the no-catalyst carrying layer is smaller in Example 1 than in Example 2, the higher current density is obtained in Example 1 because in Example 1, an average pore diameter of the MPL is smaller and a capillary force in the MPL is stronger.

Example 4

A fuel cell unit was prepared in completely the same manner as in Example 1 except that, as the substrate of each of the gas diffusion electrodes, there was used carbon non-woven cloth (manufactured by Freudenberg & Co. KG, H2315 Ix6). The Pt amount was 0.6 mg/cm$^2$ as in Example 1.

By observing the inner portion of the space of the gas diffusion electrode according to Example 4 including a deep portion thereof, it was found that the inner portion of the space was covered with a platinum catalyst all the way to a bottom portion thereof and the platinum catalyst was carried in the space even at a depth of about 60 μm from the fiber layer surface.

In this case, a thickness of H2315 Ix6 was about 200 μm, a thickness of the catalyst carrying layer was about 60 μm, and a thickness of the MPL was about 80 μm. Accordingly, a thickness of the no-catalyst carrying layer of the gas diffusion electrode according to this example was estimated to be about 60 μm.

Comparative Example 4

A fuel cell unit was prepared in completely the same manner as in Example 1 except that, as the substrate of each of the gas diffusion electrodes, there was used carbon non-woven cloth (manufactured by Freudenberg & Co. KG, H2315 I3C1).

The H2315 I3C1 is the carbon non-woven cloth having a structure in which the MPL is not provided to the H2315 Ix6. The Pt amount was 0.6 mg/cm$^2$ as in Example 4.

The fuel cell unit prepared in each of Example 4 and Comparative Example 4 was subjected to the power generation test, as in Example 1, at a cell temperature of 40° C. by supplying a hydrogen gas to the anode-side separator by the dead-ended mode and by supplying air to the cathode-side separator at predetermined temperature/humidity and airflow rate.

Figure 12:
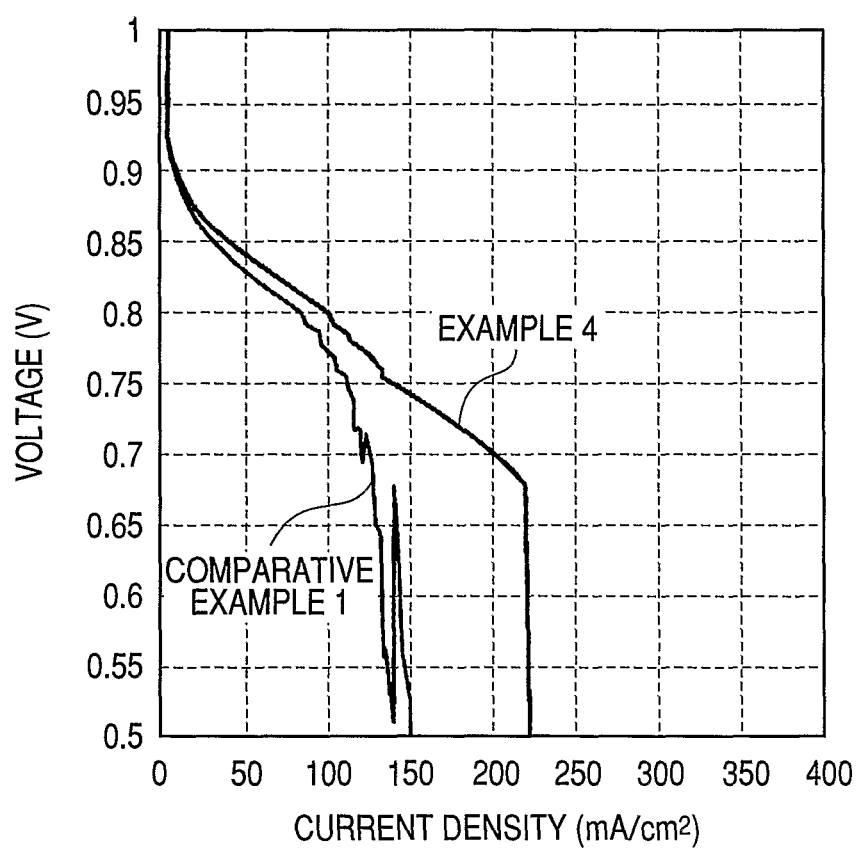
FIG. 12 is a graph illustrating current-voltage characteristics of each of polymer electrolyte fuel cells according to Example 4 and Comparative Example 4 of the present invention.

FIG. 12 illustrates current-voltage characteristics of the fuel cell unit, obtained in a case where air (40° C., relative humidity of 100%) was supplied to the cathode side in an amount of 70 ccm. A sweep rate of a current value was 0.1 mA/cm$^2$/s. Under this condition, as described in Example 1 mentioned above, the flooding easily occurs.

In FIG. 12, a comparison was made between current densities at a time when a voltage was reduced to 0.5 V due to the flooding. The current density obtained by the fuel cell unit of Example 4 was about 220 mA/cm$^2$ or more, and that of Comparative Example 4 was only about 150 mA/cm$^2$. That is, the gas diffusion electrode of Example 4 was suppressed in voltage reduction resulting from diffusion polarization to a large degree compared to the gas diffusion electrode of Comparative Example 4, thereby suppressing the flooding.

The results of FIG. 12 prove that, in Comparative Example 4 having a structure in which the gas diffusion electrode is not provided with the MPL, effects of the present invention cannot be sufficiently obtained and the output reduction or the flooding easily occur.

The exemplary embodiment is described above for providing the polymer electrolyte fuel cell having the stable power generation characteristics by using the gas diffusion electrode. The manufacturing method for the fuel cell according to the exemplary embodiment of the present invention is a simple manufacturing method, so the fuel cell can be provided at low costs.

Further, with the fuel cell according to the exemplary embodiment of the present invention, the flooding in the gas diffusion electrode can be suppressed, so the fuel cell can be stably driven for a long time.

Further, the fuel cell employing the gas diffusion electrodes according to the exemplary embodiment of the present invention has a high output and a simple structure, so costs thereof are low, and the fuel cell can be used as a fuel cell for use in portable electrical apparatuses such as mobile phones, notebook personal computers, or digital cameras under various environments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-023114, filed Feb. 1, 2007, which is hereby incorporated by reference herein in its entirety.

The invention claimed is:

1. A gas diffusion electrode comprising:
a membrane formed of conductive fibers;
a layer formed of conductive particles existing while coming into contact with one of surfaces of the membrane; and
a catalyst,
wherein the membrane formed of the conductive fibers comprises a layer carrying the catalyst and a layer free from carrying the catalyst, the layer carrying the catalyst including a surface of the membrane formed of the conductive fibers on an opposite side of a surface of the membrane formed of the conductive fibers, which is brought into contact with the layer formed of the conductive particles, and
wherein a pore ratio of the membrane formed of the conductive fibers is larger than a pore ratio of the layer formed of the conductive particles,
wherein the membrane formed of the conductive fibers has spaces having a mode diameter of 10 μm to 100 μm,
wherein each of the layer carrying the catalyst of the membrane formed of the conductive fibers, the layer free from carrying the catalyst of the membrane formed of the conductive fibers, and the layer formed of the conductive particles comprises a hydrophobic agent,
wherein the layer carrying the catalyst has a thickness of 20 μm or more in a direction perpendicular to the one of the surfaces, and
wherein the layer free from carrying the catalyst has a thickness of 50 μm or more in the direction perpendicular to the one of the surfaces.

2. The gas diffusion electrode according to claim 1, wherein catalyst particles are directly carried by the conductive fibers in the layer carrying the catalyst.

3. The gas diffusion electrode according to claim 1, wherein the catalyst is formed on the conductive fibers by one of oxidation reactive sputtering and reactive ion plating.

4. The gas diffusion electrode according to claim 1, wherein the catalyst is obtained by reducing platinum oxide.

5. A fuel cell comprising:
a pair of gas diffusion electrodes; and
an electrolyte membrane sandwiched between the pair of gas diffusion electrodes, wherein:
at least one of the pair of gas diffusion electrodes comprises the gas diffusion electrode according to claim 1; and
the layer carrying the catalyst is brought into contact with the electrolyte membrane.

* * * * *